United States Patent
Feng et al.

(10) Patent No.: US 12,493,220 B2
(45) Date of Patent: Dec. 9, 2025

(54) OPTICAL DIMMING DEVICES WITH CHIRAL FERROELECTRIC NEMATIC LIQUID CRYSTAL

(71) Applicant: Meta Platforms Technologies, LLC, Menlo Park, CA (US)

(72) Inventors: Chenrun Feng, Kent, OH (US); Olga Vladimirovna Barykina-Tassa, San Mateo, CA (US); Afsoon Jamali, Issaquah, WA (US); Jonathan William Onorato, Seattle, WA (US); Jasmine Soria Sears, Portland, OR (US); Gareth Valentine, Kirkland, WA (US); Xi Wu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/461,231

(22) Filed: Sep. 5, 2023

(65) Prior Publication Data
US 2024/0094584 A1 Mar. 21, 2024

Related U.S. Application Data

(60) Provisional application No. 63/404,118, filed on Sep. 6, 2022.

(51) Int. Cl.
*G02F 1/135* (2006.01)
*C09K 19/58* (2006.01)
*G02F 1/137* (2006.01)

(52) U.S. Cl.
CPC .......... *G02F 1/1357* (2021.01); *C09K 19/582* (2013.01); *G02F 1/135* (2013.01); *G02F 1/137* (2013.01); *G02F 2202/06* (2013.01)

(58) Field of Classification Search
CPC ........ G02F 1/1357; G02F 1/135; G02F 1/137; G02F 2202/06; G02F 1/133601;
(Continued)

(56) References Cited

U.S. PATENT DOCUMENTS 5,335,303 A * 8/1994 Buchecker ........... C07D 239/26
359/332
5,539,555 A 7/1996 Wand et al.
(Continued)

FOREIGN PATENT DOCUMENTS

GB 2303464 A * 2/1997 ........... G02F 1/1396
JP 2584235 B2 * 11/1996 ............. G02F 1/133

OTHER PUBLICATIONS

English Machine Translation of Kawagishi, JP 2584235 (Year: 2024).*
(Continued)

*Primary Examiner* — Donald L Raleigh
(74) *Attorney, Agent, or Firm* — Greenberg Traurig, LLP

(57) ABSTRACT

An optical device includes a first electrode and a medium that includes ferroelectric liquid crystals and chiral dopants. The medium is located adjacent to the first electrode. The optical device may also include a second electrode distinct and separate from the first electrode. The optical device may be used as an optical dimming device, controlling an amount light passing through the optical device based on a voltage gradient provided to the optical device.

15 Claims, 7 Drawing Sheets

(58) Field of Classification Search
CPC ... G02F 1/141; C09K 19/582; C09K 19/0225; C09K 19/586; C09K 2019/0466; C09K 2019/122; C09K 2019/2078; C09K 2019/3422
See application file for complete search history.

(56) References Cited

U.S. PATENT DOCUMENTS

| | | | |
|---|---|---|---|
| 7,468,198 B2 * | 12/2008 | Wand | C09K 19/406 252/299.61 |
| 2015/0198855 A1 * | 7/2015 | Kim | G02F 1/133707 349/182 |
| 2016/0017226 A1 * | 1/2016 | Fujisawa | G02F 1/134363 349/33 |
| 2016/0284265 A1 | 9/2016 | Prache | |
| 2017/0102577 A1 * | 4/2017 | Chien | G02F 1/136286 |
| 2023/0103091 A1 * | 3/2023 | Held | G02B 27/0172 345/630 |

OTHER PUBLICATIONS

International Search Report and Written Opinion for International Application No. PCT/US2023/032082, mailed Dec. 21, 2023, 11 pages.

\* cited by examiner

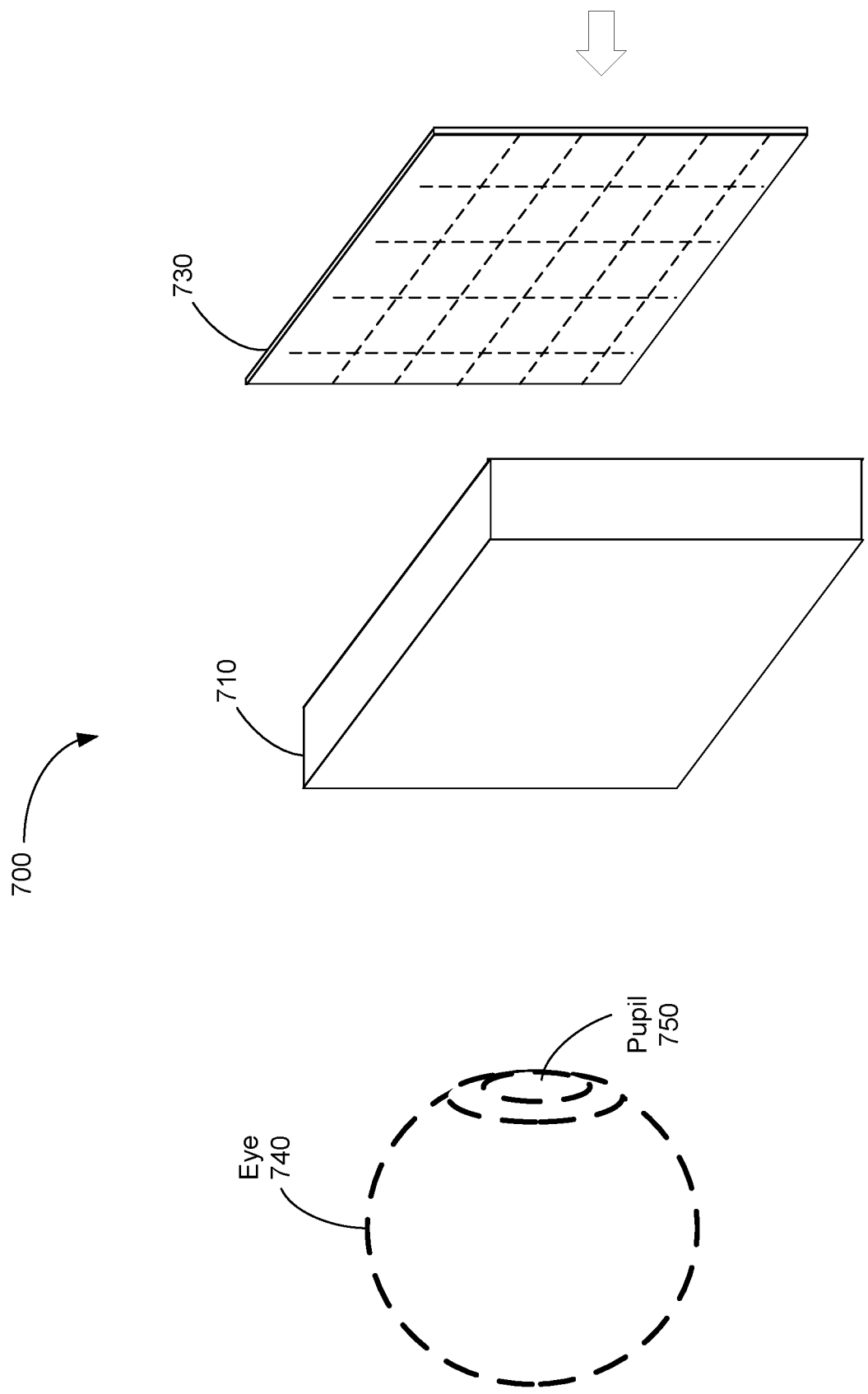

OPTICAL DIMMING DEVICES WITH CHIRAL FERROELECTRIC NEMATIC LIQUID CRYSTAL

RELATED APPLICATIONS

This application claims the benefit of, and priority to, U.S. Provisional Patent Application Ser. No. 63/404,118, entitled "Optical Dimming Devices with Chiral Ferroelectric Nematic Liquid Crystal" filed Sep. 6, 2022, which is incorporated by reference herein in its entirety.

TECHNICAL FIELD

The present disclosure relates generally to optical devices and, more specifically, to optical devices with ferroelectric liquid crystals.

BACKGROUND

Electro-optic devices are widely used in optical applications. By providing the ability to modulate light based on applied electrical signals, electro-optic devices can be used, for example, to switch on or off transmission of light. Additionally or alternatively, electro-optic devices can be used to modify optical properties of light, such as polarization or spectral power distribution.

Certain electro-optic devices may include liquid crystals. The liquid crystals are arranged based on an electrical field applied to such electro-optic devices. Based on the arrangement of the liquid crystals, such electro-optic devices modify optical properties of light.

SUMMARY

However, there is a need for improving a transition speed (e.g., a speed in switching from an "on" state to an "off" state or from the "off" state to the "on" state), a dynamic ratio (e.g., a ratio of the transmittance while the optical device is in the "on" state and the transmittance while the optical device is in the "off" state), and power consumption.

This application describes optical devices that utilize ferroelectric liquid crystals for providing a high transition speed and a high dynamic ratio. The disclosed devices may be operated with a low electric field, which reduces power consumption. Such devices, when operated using a battery, have a longer battery life than conventional electro-optic devices.

In accordance with some embodiments, an optical device includes a first electrode and a medium that includes ferroelectric liquid crystals and chiral dopants. The medium is located adjacent to the first electrode.

In some embodiments, the first electrode is transparent.

In some embodiments, the optical device includes a second electrode that is distinct and separate from the first electrode.

In some embodiments, the second electrode is transparent.

In some embodiments, the first electrode extends along a first plane, and the second electrode extends along a second plane parallel to, and offset from, the first plane.

In some embodiments, the first electrode and the second electrode extend along a common plane.

In some embodiments, the first electrode is separated from the second electrode by at least 20 μm.

In some embodiments, the optical device includes a first substrate located adjacent to the first electrode.

In some embodiments, the optical device includes a second substrate distinct and separate from the first substrate.

In some embodiments, the first substrate is separated from the second substrate by at least 1 μm.

In some embodiments, the optical device includes a first optical polarizer.

In some embodiments, the optical device includes a second optical polarizer distinct from the first optical polarizer. The first optical polarizer is located adjacent to the first substrate and the second optical polarizer is located adjacent to the second substrate, or the first optical polarizer is located adjacent to the second substrate and the second optical polarizer is located adjacent to the first substrate.

In some embodiments, the ferroelectric liquid crystals include one or more selected from a group consisting of: aromatic mesogens with 2,5-substituted 1,3-dioxane groups, aromatic mesogens with two or more oriented ester bonds and nitro end group, and aromatic ester mesogens with nitrile end group.

In some embodiments, the ferroelectric liquid crystals include one or more selected from a group consisting of: a rod-shaped material with 1,3-dioxane group, 4-[(4-nitrophenoxy)carbonyl]phenyl 2,4-dimethoxybenzoate, and

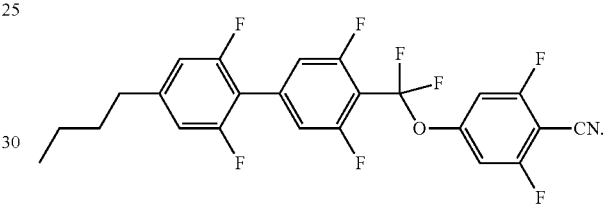

In some embodiments, the chiral dopants include one or more selected from a group consisting of ZLI811, BDH1281, R5011, and S5011.

In some embodiments, the chiral dopants include one or more selected from a group consisting of R2011, S2011, R1011, S1011, CB15, S811, and CBI15.

In accordance with some embodiments, a head-mounted display device includes a display panel and any optical device described herein. The optical device is positioned adjacent to the display panel so that light passing through the optical device impinges on the display panel.

In accordance with some embodiments, a method includes providing, at a first time, a first voltage gradient between a first electrode and a second electrode distinct and separate from the first electrode. A medium that includes ferroelectric liquid crystals and chiral dopants is located adjacent at least to the first electrode. The method also includes providing, at a second time mutually exclusive to the first time, a second voltage gradient less than the first voltage gradient between the first electrode and the second electrode.

In some embodiments, the first voltage gradient is less than 0.2 V/μM.

In some embodiments, the first voltage gradient is greater than 0.018 V/μM, and the second voltage is less than 0.018 V/μM.

The disclosed optical devices and methods may replace conventional optical devices and methods. The disclosed optical devices and methods may complement conventional optical devices and methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 7 is an isometric view of a display device in accordance with some embodiments.

These figures are not drawn to scale unless indicated otherwise.

DETAILED DESCRIPTION

As described above, conventional electro-optic devices have limited transition speed and dynamic ratio. The electro-optic devices described herein provide fast transition speed and high dynamic ratio. In addition, the electro-optic devices described herein require a low electrical field, which in turn reduces power consumption. In certain configurations, a transition speed of approximately 1 millisecond may be achieved.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
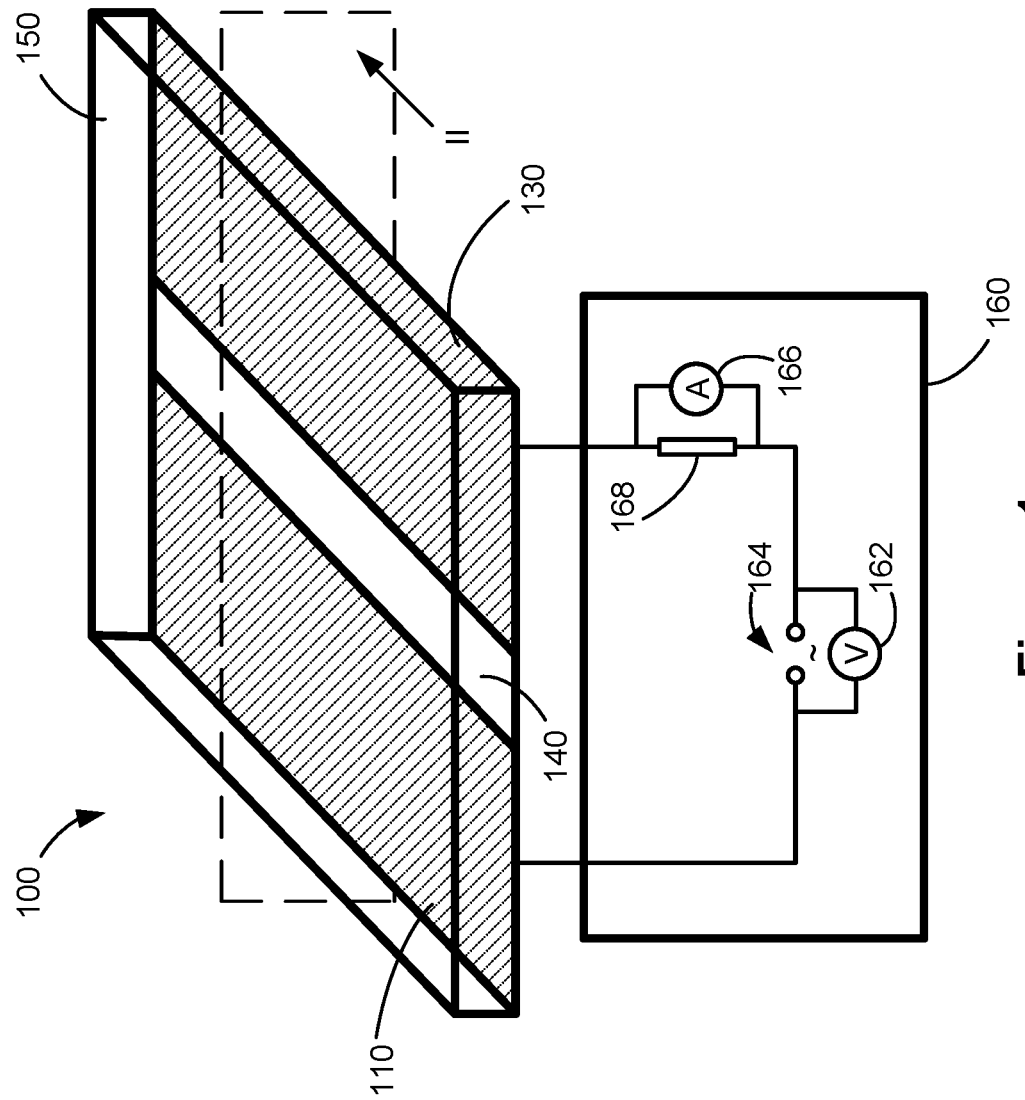
FIG. 1 is a schematic diagram illustrating an electro-optic device in accordance with some embodiments.

FIG. 1 is a schematic diagram illustrating an electro-optic device 100 in accordance with some embodiments.

The electro-optic device 100 includes a first electrode 110. The first electrode 110 may provide an electrical field to a medium (e.g., a medium 210 described below with respect to FIG. 2) located adjacent to the first electrode.

FIG. 1 also shows that, in some embodiments, the electro-optic device 100 also includes a second electrode 130. In some embodiments, the second electrode 130 is distinct and separate from the first electrode 110.

FIG. 1 shows that, in some embodiments, the electro-optic device 100 also includes a first substrate 140. In some embodiments, the first substrate 140 is located adjacent to the first electrode 110 (e.g., the first electrode 110 is located adjacent to the first substrate 140). In some embodiments, the first substrate 140 is also located adjacent to the second electrode 130 (e.g., the second electrode 130 is also located adjacent to the first substrate 140).

In some embodiments, the electro-optic device 100 is electrically coupled with an electrical source 160. The electrical source 160 may provide a voltage or current to the electro-optic device 100 (e.g., across or between the first electrode 110 and the second electrode 130). For example, in some embodiments, the first electrode 110 and the second electrode 130 are electrically coupled with the electrical source 160. In some embodiments, the electro-optic device 100 includes the electrical source 160. In some embodiments, the electrical source 160 is not part of the electro-optic device 100.

As shown in FIG. 1, in some embodiments, the electrical source 160 includes one or more voltage sources 162 and 164. In some embodiments, the electrical source 160 includes one or more current sources 166. In some embodiments, the electrical source 160 includes one or more voltage sources 162 and 164 and one or more current sources 166. In some embodiments, the electrical source 160 includes one or more voltage sources 162 and 164 without one or more current sources 166. In some embodiments, the electrical source 160 includes one or more current sources 166 without one or more voltage sources 162 and 164.

In some embodiments, the electrical source 160 includes an electrical power storage (e.g., a battery or a capacitor).

In some embodiments, the electro-optic device 100 also includes a source of electrostatic (e.g., an electrostatic material). This allows generation of an electrical field without using an electrical power source.

As shown in FIG. 1, in some embodiments, the one or more current sources 166 are electrically connected in parallel to one or more impedances 168 (e.g., resistors). In some embodiments, one or more current sources are electrically connected in series.

As shown in FIG. 1, in some embodiments, the one or more voltage sources 162 and 164 are electrically connected in parallel (e.g., the voltage source 162 is electrically connected in parallel to the voltage source 164). In some embodiments, the one or more voltage sources 162 and 164 include a direct-current voltage source. In some embodiments, the one or more voltage sources 162 and 164 include an alternating-current voltage source (or a dynamic voltage source that provides voltages in a non-sinusoidal pattern). In some embodiments, the one or more voltage sources 162 and 164 include both a direct-current voltage source and an alternating-current voltage source (or a dynamic voltage source).

As shown in FIG. 1, in some embodiments, the electro-optic device 100 includes a second substrate 150. In some embodiments, the second substrate 150 is distinct and separate from the first substrate 140. This allows the first substrate 140 and the second substrate 150 to define a cavity between the first substrate 140 and the second substrate. In some configurations, the electro-optic device 100 includes a medium (e.g., the medium 210 described with respect to FIG. 2) in the cavity.

Figure 2:
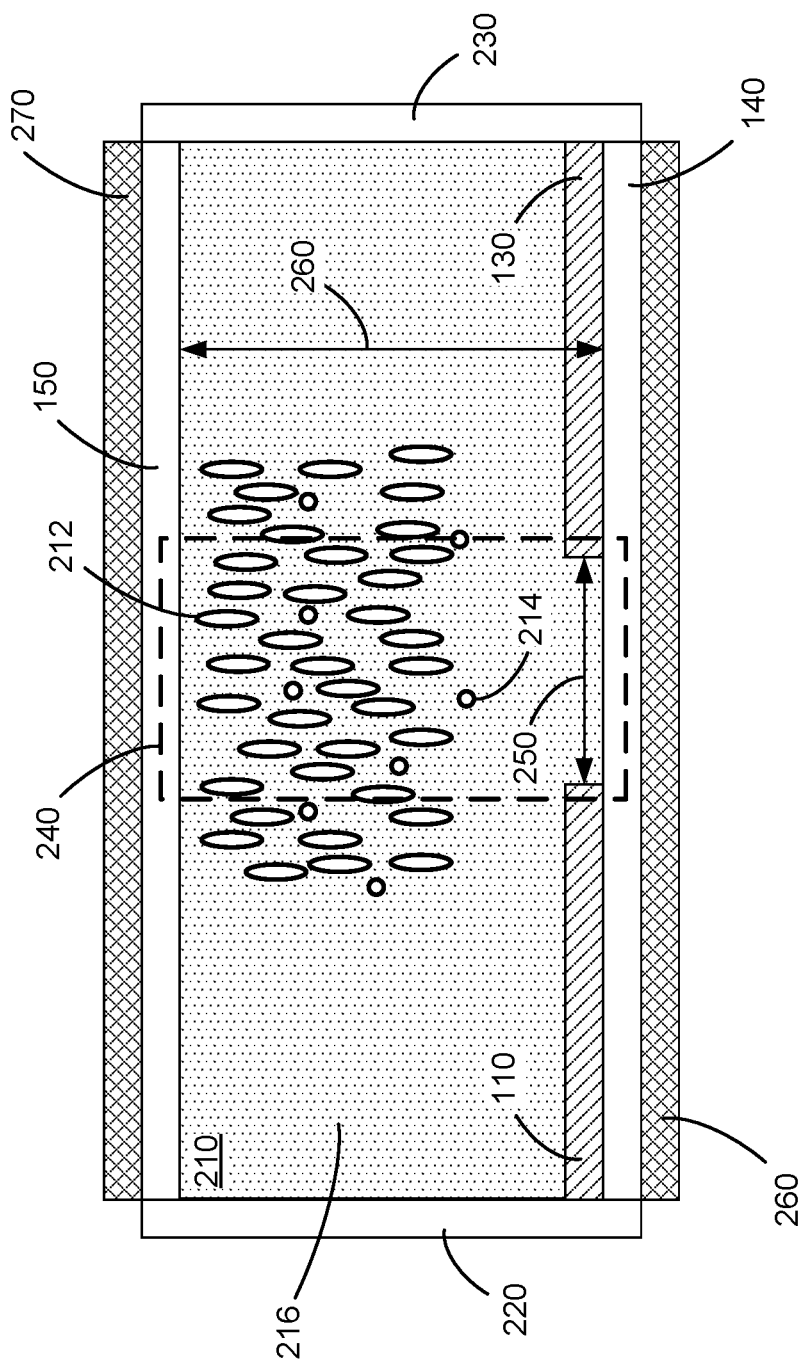
FIG. 2 illustrates a cross-sectional view of the electro-optic device shown in FIG. 1 in accordance with some embodiments.

FIG. 1 also shows a plane from which the cross sectional view shown in FIG. 2 is taken.

FIG. 2 illustrates a cross-sectional view of the electro-optic device 100 shown in FIG. 1 in accordance with some embodiments. Similar to FIG. 1, FIG. 2 also shows the first electrode 110, the second electrode 130, the first substrate 140, and the second substrate 150. FIG. 2 also shows that, in some embodiments, the electro-optic device 100 also includes one or more side walls 220 and 230.

FIG. 2 illustrates that the first electrode 110 and the second electrode 130 are separated by a distance 250. FIG. 2 also illustrates that the first substrate 140 and the second substrate 150 are separated by a distance 260.

FIG. 2 also shows the medium 210 located adjacent to the first electrode 110 (e.g., in contact with the first electrode 110, or in proximity to the first electrode 110 even without a direct contact with the first electrode 110). As shown in FIG. 2, the medium 210 may also be located adjacent to the second electrode 130 (e.g., concurrently in contact with both the first electrode 110 and the second electrode 130, or in proximity to the first electrode 110 and the second electrode 130 with or without a direct contact with one or both of the first electrode 110 and the second electrode 130). In some embodiments, as shown in FIG. 2, the medium 210 is located between the first substrate 140 and the second substrate 150. In some embodiments, as shown in FIG. 2, the medium 210 is located in a cavity defined by the first substrate 140, the second substrate 150, and the side walls 220 and 230.

The medium 210 includes ferroelectric liquid crystals 212.

In some embodiments, the ferroelectric liquid crystals include one or more selected from a group consisting of: aromatic mesogens with 2,5-substituted 1,3-dioxane groups (DIO analog), aromatic mesogens with two or more oriented ester bonds and nitro end group (RM734 analog), and aromatic ester mesogens with nitrile end group.

In some embodiments, the ferroelectric liquid crystals include:

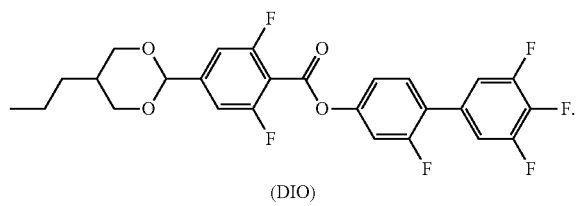 [SMILES: CCCC1COC(c2cc(F)c(C(=O)Oc3ccc(-c4cc(F)c(F)c(F)c4)c(F)c3)c(F)c2)OC1 ; "(DIO)"]

(DIO)

In some embodiments, the ferroelectric liquid crystals include:

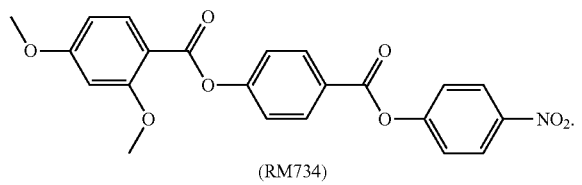

(RM734)

In some embodiments, the ferroelectric liquid crystals include one or more selected from a group consisting of: (i) a rod-shaped material with 1,3-dioxane group, (ii) 4-[(4-nitrophenoxy)carbonyl]phenyl 2,4-dimethoxybenzoate, and (iii)

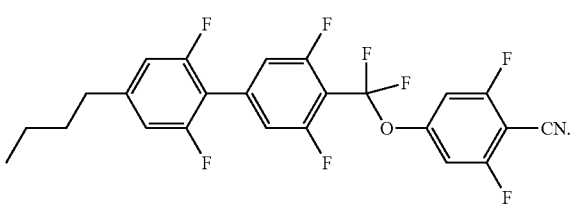 [SMILES: CCCCc1cc(F)c(-c2cc(F)c(C(F)(F)Oc3cc(F)c(C#N)c(F)c3)c(F)c2)c(F)c1]

In some embodiments, the chiral dopants 214 include one or more selected from a group consisting of ZLI811, BDH1281, R5011, and S5011. In some embodiments, ZLI811 has a structure represented by:

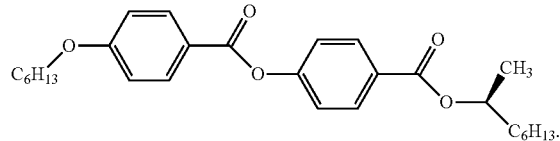

In some embodiments, BDH1281 has a structure represented by:

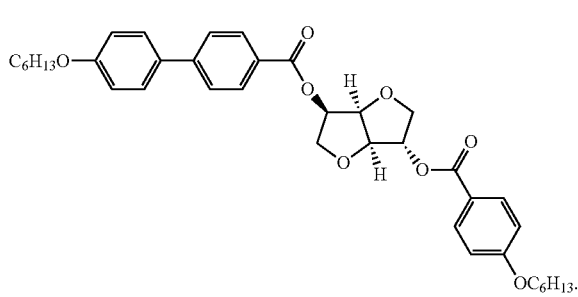

In some embodiments, R5011 has a structure represented by:

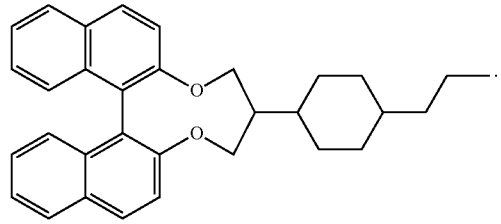 [SMILES: CCCC1CCC(C2COc3ccc4ccccc4c3-c3c(ccc4ccccc34)OC2)CC1]

In some embodiments, S5011 has a structure represented by:

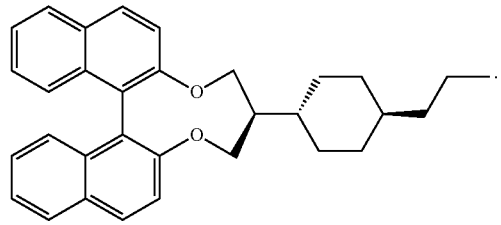

In some embodiments, the chiral dopants 214 include one or more selected from a group consisting of R2011 ([4(R)-[Trans(Trans)]]-1,3-Difluoro-2-[(1-Methylheptyl)Oxy]-5-(4'-Propyl[1,1'-Bicyclohexyl]-4-Yl)Benzene), S2011 ([4(s)-[Trans(Trans)]]-1,3-Difluoro-2-[(1-Methylheptyl) Oxy]-5-(4'-Propyl[1,1'-Bicyclohexyl]-4-Yl)Benzene), R1011 (Benzoic Acid, 4-(Trans-4-Pentylcyclohexyl)-, (1r)-1-Phenyl-1,2-Ethanediyl Ester), S1011, CB15 (4'-[(S)-2-Methylbutyl]Biphenyl-4-Carbonitrile), R811 ((R)-2-Octyl 4-[4-(Hexyloxy) Benzoyloxy]Benzoate), and S811 (S-(+)-2-Octyl 4-(4-Hexyloxybenzoyloxy) Benzoate).

In some embodiments, the chiral dopants 214 include one or more selected from a group consisting of:

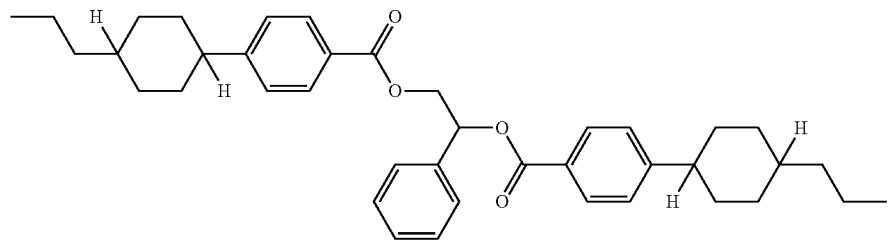

Benzoic acid, 4-(trans-4-propylcyclohexyl)-1,1'-[(1(S)(+))-1-phenyl-1,2-ethanediyl] ester

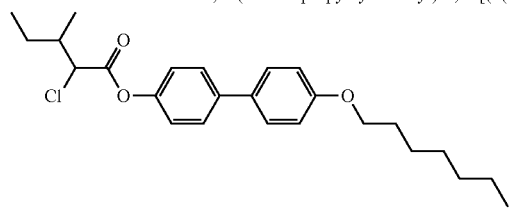

(2S,3S)-4'-(heptyloxy)biphenyl-4-yl 2-chloro-3-methylpentanoate

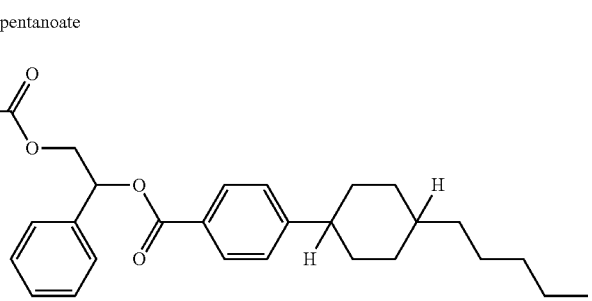

(S)-4-Cyano-4'-(2-methylbutyl)biphenyl

Benzoic acid, 4-(trans-4-pentylcyclohexyl)-1,1'-[(1(S)(+))-1-phenyl-1,2-ethanediyl] ester In some embodiments, the chiral dopants 214 include any chiral dopant described herein. In some embodiments, the chiral dopants 214 may include any other chiral dopants.

In some embodiments, the medium 210 includes one or more colorants. In some configurations, the one or more colorants may provide a default color (e.g., a default absorption profile) for the medium 210. For example, the one or more colorants may add a tint to the electro-optic device.

In some embodiments, the medium 210 may include other components (e.g., solvent, etc.).

In some embodiments, the electro-optic device also includes one or more optical components (e.g., lenses, optical filters, optical polarizers, etc.). For example, FIG. 2 shows that, in some embodiments, the electro-optic device includes a first optical polarizer 260 and a second optical polarizer 270. In FIG. 2, the first optical polarizer 260 is positioned adjacent to the first substrate 140 and the second optical polarizer 270 is positioned adjacent to the second substrate 150. In some embodiments, the electro-optic device includes the first optical polarizer 260 without the second optical polarizer 270. In some embodiments, the electro-optic device includes the second optical polarizer 270 without the first optical polarizer 260. In some embodiments, the first optical polarizer 260 is in contact with the first substrate 140. In some embodiments, the first optical polarizer 260 is not in direct contact with the first substrate 140 (e.g., one or more intervening components may be located between the first optical polarizer 260 and the first substrate 140). In some embodiments, the second optical polarizer 270 is in contact with the second substrate 150. In some embodiments, the second optical polarizer 270 is not in direct contact with the second substrate 150 (e.g., one or more intervening components may be located between the second optical polarizer 270 and the second substrate 150). In some embodiments, the first optical polarizer 260 and the second optical polarizer 270 are positioned away from the medium 210 (e.g., the first optical polarizer 260 and the second optical polarizer 270 are not in direct contact with the medium 210). In some embodiments, at least one of the first optical polarizer 260 or the second optical polarizer 270 is positioned to be in direct contact with the medium 210.

Figures 3A, 3B, 3C:
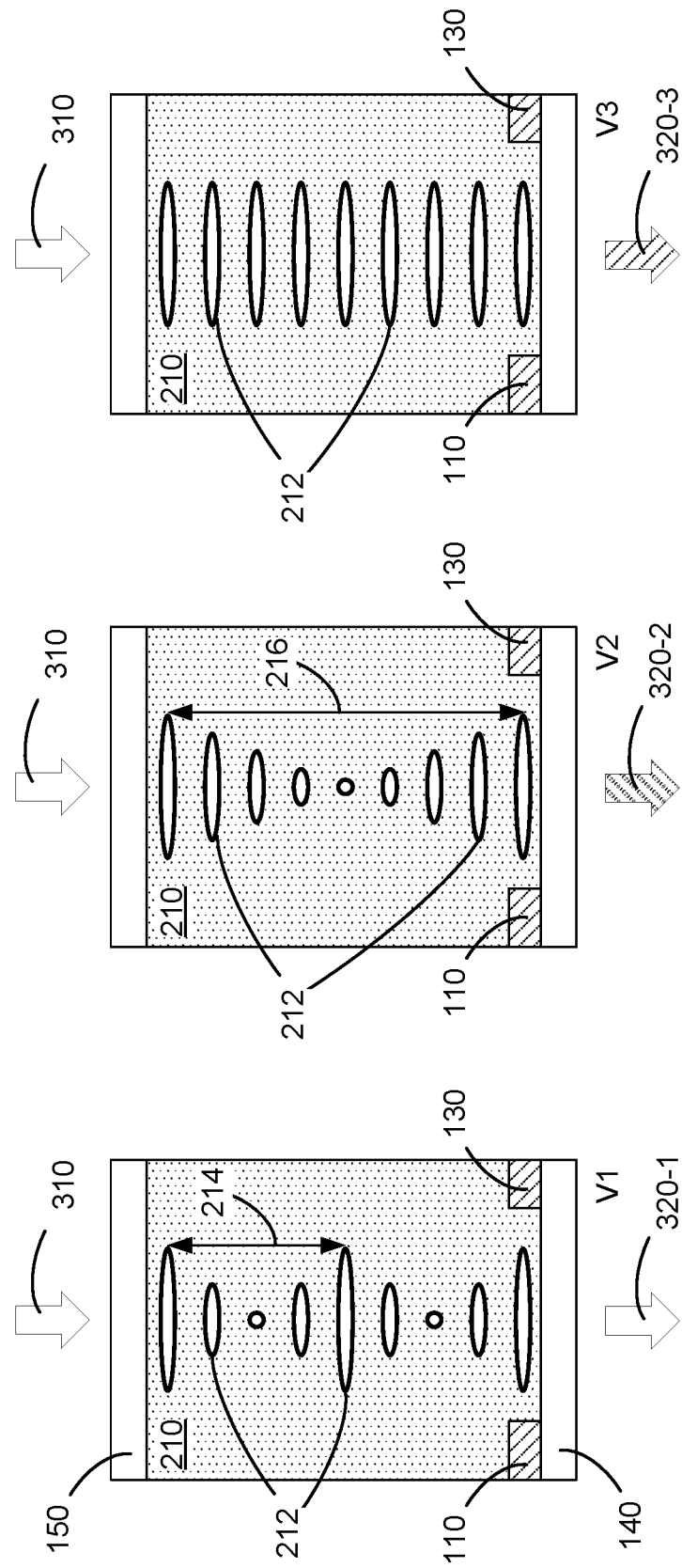
FIGS. 3A-3C are schematic diagrams illustrating arrangements of liquid crystals in accordance with some embodiments.

FIGS. 3A-3C are schematic diagrams illustrating arrangements of liquid crystals in accordance with some embodiments.

FIG. 3A illustrates the arrangement of liquid crystals 212 when a first voltage V1 (e.g., 0 V) is applied across the electrodes 110 and 130. In FIG. 3A, the liquid crystals 212 are arranged in a helix having a pitch 214.

FIG. 3B illustrates the arrangement of liquid crystals 212 when a second voltage V2 greater than V1 is applied across the electrodes 110 and 130. In FIG. 3B, the liquid crystals 212 are arranged in a helix having a pitch 216 that is distinct from the pitch 214 (e.g., greater than the pitch 214).

FIG. 3C illustrates the arrangement of liquid crystals 212 when a third voltage V3 greater than V2 is applied across the electrodes 110 and 130. In FIG. 3C, the liquid crystals 212 are arranged facing a same lateral direction.

FIGS. 3A-3C also illustrate that the different arrangements of liquid crystals affect light passing through the electro-optic device differently. For example, the different arrangements of liquid crystals may affect the intensity or polarization of light that is passed through the electro-optic device. For example, in response to light 310 provided to the electro-optic device, light output from the electro-optic device may have different intensity and/or polarization depending on the arrangement of liquid crystals, which, in turn, depends on the voltage applied across the electrodes 110 and 130. For example, light 320-2 may have a different intensity and/or polarization than light 320-1. For example, light 320-3 may have a different intensity and/or polarization than light 320-2 or light 320-1.

Figure 4:
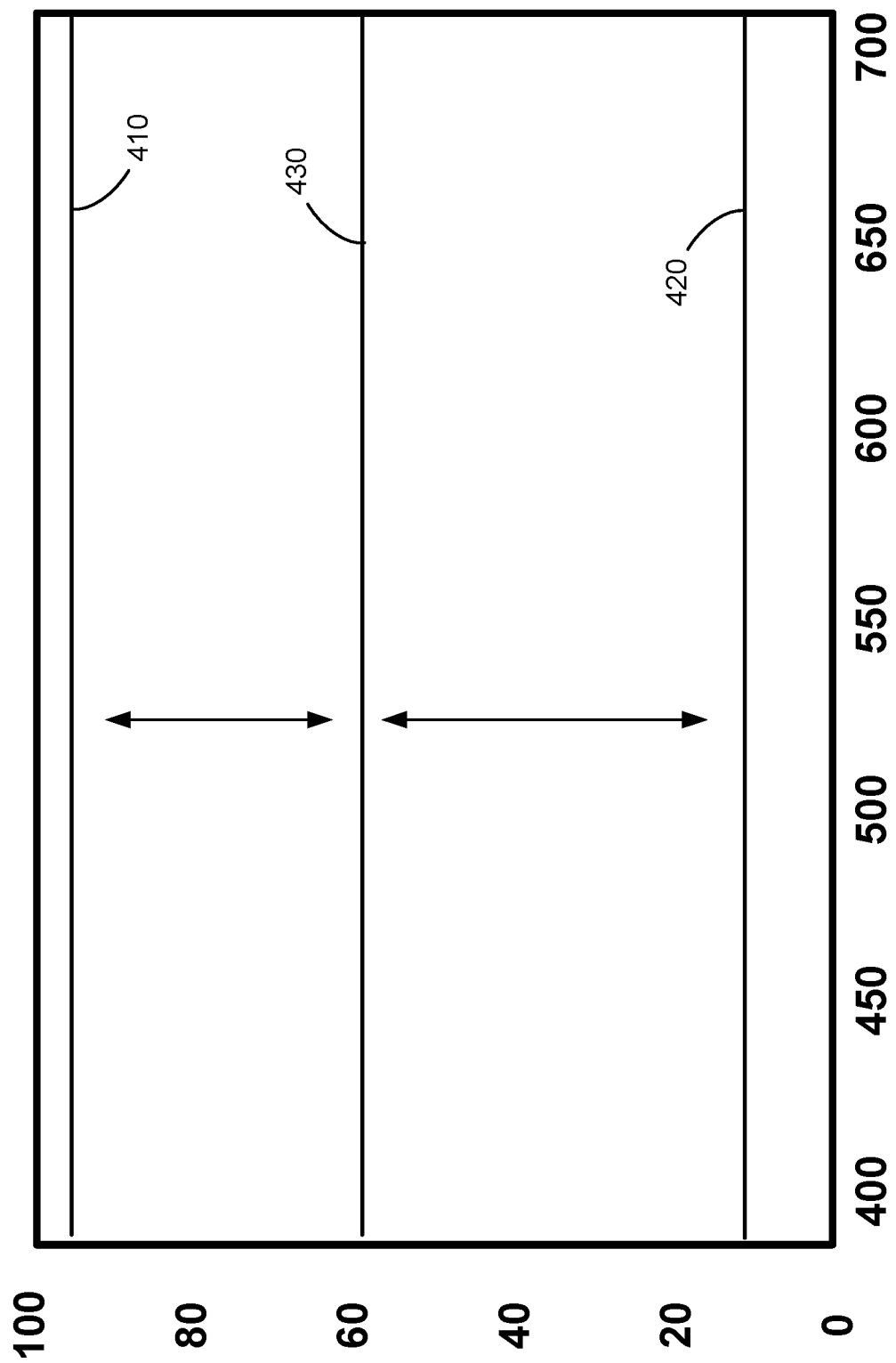
FIG. 4 is a schematic diagram illustrating transmittance curves in accordance with some embodiments.

FIG. 4 is a schematic diagram illustrating transmittance curves in accordance with some embodiments. By changing the voltage applied across the electrodes 110 and 130, the transmittance of the electro-optic device changes. For example, when the voltage applied between the electrodes 110 and 130 increases, in some configurations, the transmittance decreases from a transmittance curve 410 to a transmittance curve 430, and then to a transmittance curve 420. In some embodiments, the transmittance curve 410 may represent a transmittance curve of the electro-optic device when voltage V1 is applied, as illustrated in FIG. 3A; the transmittance curve 430 may represent a transmittance curve of the electro-optic device when voltage V2 is applied, as illustrated in FIG. 3B; and the transmittance curve 420 may represent a transmittance curve of the electro-optic device when voltage V3 is applied, as illustrated in FIG. 3C. Although the transmittance curves may have slopes and other features, they are not shown in FIG. 4 so as not to obscure other aspects of operations of the electro-optic device. In FIG. 4, the transmittance curve 410 represents a transmittance higher than 90%. In FIG. 4, the transmittance curve 420 represents a transmittance less than 15%.

In some embodiments, an electro-optic device (e.g., 100) may be used in display devices such as head-mounted display devices. In some embodiments, an electro-optic device (e.g., 100) may be implemented as multifunctional optical components in near-eye displays for augmented reality ("AR"), virtual reality ("VR"), and/or mixed reality ("MR"). For example, the disclosed optical elements or devices may be implemented as optical dimming elements (e.g., variable intensity filters), etc., which may significantly reduce the weight and size, and enhance the optical performance of the head-mounted display devices. Exemplary embodiments of head-mounted display devices for implementing an electro-optic device (e.g., 100) are described with respect to FIGS. 5-7.

Figure 5:
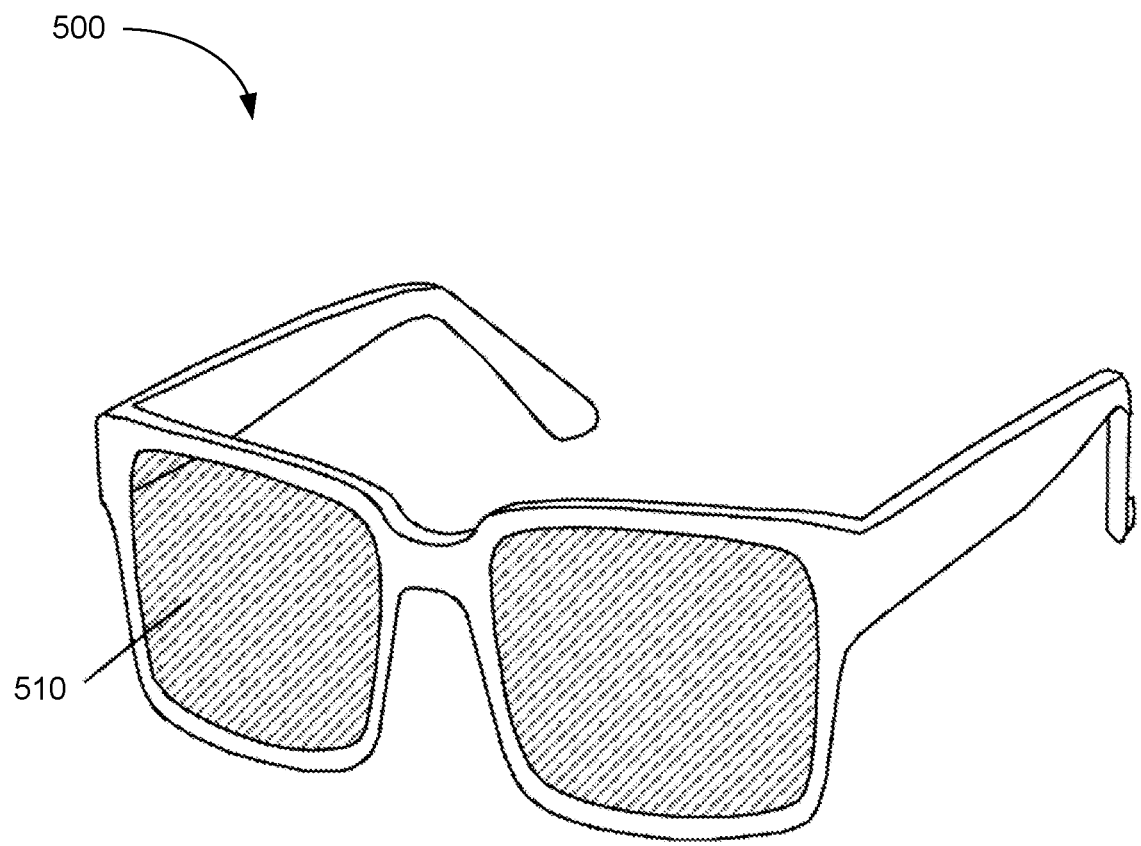
FIG. 5 is a perspective view of a display device in accordance with some embodiments.

FIG. 5 illustrates display device 500 in accordance with some embodiments. In some embodiments, display device 500 is configured to be worn on a head of a user (e.g., by having the form of spectacles or eyeglasses, as shown in FIG. 5) or to be included as part of a helmet that is to be worn by the user. When display device 500 is configured to be worn on a head of a user or to be included as part of a helmet, display device 500 is called a head-mounted display. Alternatively, display device 500 is configured for placement in proximity of an eye or eyes of the user at a fixed location, without being head-mounted (e.g., display device 500 is mounted in a vehicle, such as a car or an airplane, for placement in front of an eye or eyes of the user). As shown in FIG. 5, display device 500 includes display 510. Display 510 is configured for presenting visual contents (e.g., augmented reality contents, virtual reality contents, mixed reality contents, or any combination thereof) to a user.

Figure 6:
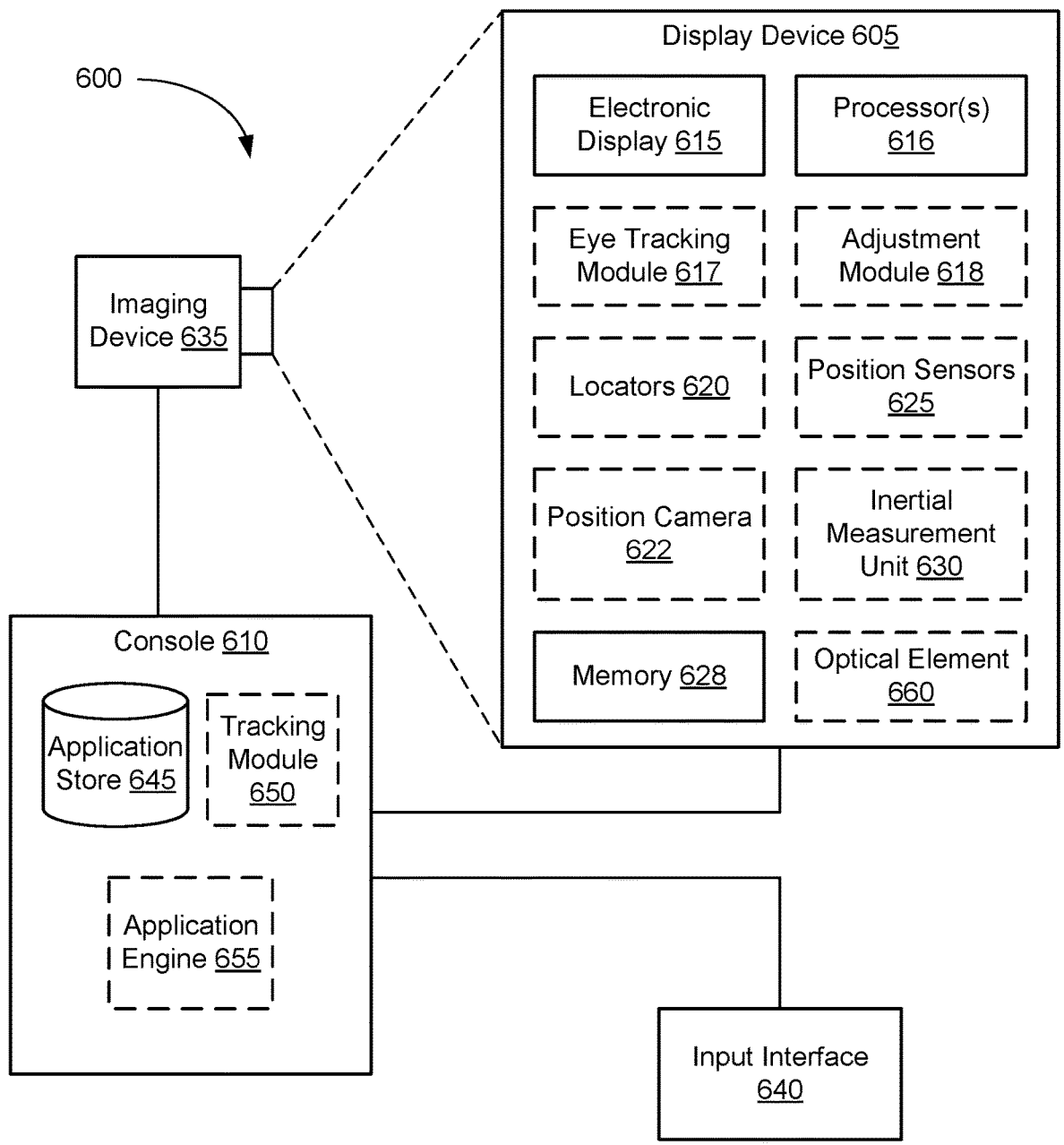
FIG. 6 is a block diagram of a system including a display device in accordance with some embodiments.

In some embodiments, display device 500 includes one or more components described herein with respect to FIG. 6. In some embodiments, display device 500 includes additional components not shown in FIG. 6.

FIG. 6 is a block diagram of system 600 in accordance with some embodiments. The system 600 shown in FIG. 6 includes display device 605 (which corresponds to display device 500 shown in FIG. 5), imaging device 635, and input interface 640 that are each coupled to console 610. While FIG. 6 shows an example of system 600 including one display device 605, imaging device 635, and input interface 640, in other embodiments, any number of these components may be included in system 600. For example, there may be multiple display devices 605 each having associated input interface 640 and being monitored by one or more imaging devices 635, with each display device 605, input interface 640, and imaging devices 635 communicating with console 610. In alternative configurations, different and/or additional components may be included in system 600. For example, in some embodiments, console 610 is connected via a network (e.g., the Internet or a wireless network) to system 600 or is self-contained as part of display device 605 (e.g., physically located inside display device 605). In some embodiments, display device 605 is used to create mixed reality by adding in a view of the real surroundings. Thus, display device 605 and system 600 described here can deliver augmented reality, virtual reality, and mixed reality.

In some embodiments, as shown in FIG. 5, display device 605 is a head-mounted display that presents media to a user. Examples of media presented by display device 605 include one or more images, video, audio, or some combination thereof. In some embodiments, audio is presented via an external device (e.g., speakers and/or headphones) that receives audio information from display device 605, console 610, or both, and presents audio data based on the audio information. In some embodiments, display device 605 immerses a user in an augmented environment.

In some embodiments, display device 605 also acts as an augmented reality (AR) headset. In these embodiments, display device 605 augments views of a physical, real-world environment with computer-generated elements (e.g., images, video, sound, etc.). Moreover, in some embodiments, display device 605 is able to cycle between different types of operation. Thus, display device 605 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 655.

Display device 605 includes electronic display 615, one or more processors 616, eye tracking module 617, adjustment module 618, one or more locators 620, one or more position sensors 625, one or more position cameras 622, memory 628, inertial measurement unit (IMU) 630, one or more optical elements 660 or a subset or superset thereof (e.g., display device 605 with electronic display 615, one or more processors 616, and memory 628, without any other listed components). Some embodiments of display device 605 have different modules than those described here. Similarly, the functions can be distributed among the modules in a different manner than is described here.

One or more processors 616 (e.g., processing units or cores) execute instructions stored in memory 628. Memory 628 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 628, or alternately the non-volatile memory device(s) within memory 628, includes a non-transitory computer readable storage medium. In some embodiments, memory 628 or the computer readable storage medium of memory 628 stores programs, modules and data structures, and/or instructions for displaying one or more images on electronic display 615.

Electronic display 615 displays images to the user in accordance with data received from console 610 and/or processor(s) 616. In various embodiments, electronic display 615 may comprise a single adjustable display element or multiple adjustable display elements (e.g., a display for each eye of a user). In some embodiments, electronic display 615 is configured to display images to the user by projecting the images onto one or more optical elements 660.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 615 projects images to one or more reflective elements 660, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 605 (e.g., a user wearing display device 605) for viewing images from display device 605. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 617 determines locations of each pupil of a user's eyes. In some embodiments, eye tracking module 617 instructs electronic display 615 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 617 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 617 maps the locations of the user's pupil while looking at the reference points to corresponding signals received on the IR tracking array). As mentioned above, in some embodiments, system 600 may use other eye tracking systems than the embedded IR one described herein.

Adjustment module 618 generates an image frame based on the determined locations of the pupils. In some embodiments, this sends a discrete image to the display that will tile subimages together thus a coherent stitched image will appear on the back of the retina. Adjustment module 618 adjusts an output (i.e., the generated image frame) of electronic display 615 based on the detected locations of the pupils. Adjustment module 618 instructs portions of electronic display 615 to pass image light to the determined locations of the pupils. In some embodiments, adjustment module 618 also instructs the electronic display to not pass image light to positions other than the determined locations of the pupils. Adjustment module 618 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 620 are objects located in specific positions on display device 605 relative to one another and relative to a specific reference point on display device 605. A locator 620 may be a light emitting diode (LED), a corner cube reflector, a reflective marker, a type of light source that contrasts with an environment in which display device 605 operates, or some combination thereof. In embodiments where locators 620 are active (e.g., an LED or other type of light emitting device), locators 620 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 620 are located beneath an outer surface of display device 605, which is transparent to the wavelengths of light emitted or reflected by locators 620 or is thin enough to not substantially attenuate the wavelengths of light emitted or reflected by locators 620. Additionally, in some embodiments, the outer surface or other portions of display device 605 are opaque in the visible band of wavelengths of light. Thus, locators 620 may emit light in the IR band under an outer surface that is transparent in the IR band but opaque in the visible band.

IMU 630 is an electronic device that generates calibration data based on measurement signals received from one or more position sensors 625. Position sensor 625 generates one or more measurement signals in response to motion of display device 605. Examples of position sensors 625 include: one or more accelerometers, one or more gyroscopes, one or more magnetometers, another suitable type of sensor that detects motion, a type of sensor used for error correction of IMU 630, or some combination thereof. Position sensors 625 may be located external to IMU 630, internal to IMU 630, or some combination thereof.

Based on the one or more measurement signals from one or more position sensors 625, IMU 630 generates first calibration data indicating an estimated position of display device 605 relative to an initial position of display device 605. For example, position sensors 625 include multiple accelerometers to measure translational motion (forward/back, up/down, left/right) and multiple gyroscopes to measure rotational motion (e.g., pitch, yaw, roll). In some embodiments, IMU 630 rapidly samples the measurement signals and calculates the estimated position of display device 605 from the sampled data. For example, IMU 630 integrates the measurement signals received from the accelerometers over time to estimate a velocity vector and integrates the velocity vector over time to determine an estimated position of a reference point on display device 605. Alternatively, IMU 630 provides the sampled measurement signals to console 610, which determines the first calibration data. The reference point is a point that may be used to describe the position of display device 605. While the reference point may generally be defined as a point in space; however, in practice the reference point is defined as a point within display device 605 (e.g., a center of IMU 630).

In some embodiments, IMU 630 receives one or more calibration parameters from console 610. As further discussed below, the one or more calibration parameters are used to maintain tracking of display device 605. Based on a received calibration parameter, IMU 630 may adjust one or more IMU parameters (e.g., sample rate). In some embodiments, certain calibration parameters cause IMU 630 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 635 generates calibration data in accordance with calibration parameters received from console 610. Calibration data includes one or more images showing observed positions of locators 620 that are detectable by imaging device 635. In some embodiments, imaging device 635 includes one or more still cameras, one or more video cameras, any other device capable of capturing images including one or more locators 620, or some combination thereof. Additionally, imaging device 635 may include one or more filters (e.g., used to increase signal to noise ratio). Imaging device 635 is configured to optionally detect light emitted or reflected from locators 620 in a field of view of imaging device 635. In embodiments where locators 620 include passive elements (e.g., a retroreflector), imaging device 635 may include a light source that illuminates some or all of locators 620, which retro-reflect the light towards the light source in imaging device 635. Second calibration data is communicated from imaging device 635 to console 610, and imaging device 635 receives one or more calibration parameters from console 610 to adjust one or more imaging parameters (e.g., focal length, focus, frame rate, ISO, sensor temperature, shutter speed, aperture, etc.).

In some embodiments, display device 605 optionally includes one or more optical elements 660 (e.g., lenses, reflectors, gratings, etc.). In some embodiments, electronic display device 605 includes a single optical element 660 or multiple optical elements 660 (e.g., an optical element 660 for each eye of a user). In some embodiments, electronic display 615 projects computer-generated images on one or more optical elements 660, such as a reflective element, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more optical elements 660 are partially transparent (e.g., the one or more optical elements 660 have a transmittance of at least 15%, 20%, 25%, 30%, 35%, 50%, 55%, or 50%), which allows transmission of ambient light. In such embodiments, computer-generated images projected by electronic display 615 are superimposed with the transmitted ambient light (e.g., transmitted ambient image) to provide augmented reality images.

In some embodiments, one or more optical elements 660, or a subset there of, are positioned to modify light (e.g., ambient light) transmitted to electronic display 615. For example, the one or more optical elements 660 may include an optical dimmer to selectively reduce the intensity of light passing through the optical dimmer. In some embodiments, optical elements 660 include an electro-optic device (e.g., 100) described above with respect to FIGS. 1-2, 3A-3C, and 4.

Input interface 640 is a device that allows a user to send action requests to console 610. An action request is a request to perform a particular action. For example, an action request may be to start or end an application or to perform a particular action within the application. Input interface 640 may include one or more input devices. Example input devices include: a keyboard, a mouse, a game controller, data from brain signals, data from other parts of the human body, or any other suitable device for receiving action requests and communicating the received action requests to console 610. An action request received by input interface 640 is communicated to console 610, which performs an action corresponding to the action request. In some embodiments, input interface 640 may provide haptic feedback to the user in accordance with instructions received from console 610. For example, haptic feedback is provided when an action request is received, or console 610 communicates instructions to input interface 640 causing input interface 640 to generate haptic feedback when console 610 performs an action.

Console 610 provides media to display device 605 for presentation to the user in accordance with information received from one or more of: imaging device 635, display device 605, and input interface 640. In the example shown in FIG. 6, console 610 includes application store 645, tracking module 650, and application engine 655. Some embodiments of console 610 have different modules than those described in conjunction with FIG. 6. Similarly, the functions further described herein may be distributed among components of console 610 in a different manner than is described here.

When application store 645 is included in console 610, application store 645 stores one or more applications for execution by console 610. An application is a group of instructions, that when executed by a processor, is used for generating content for presentation to the user. Content generated by the processor based on an application may be in response to inputs received from the user via movement of display device 605 or input interface 640. Examples of applications include: gaming applications, conferencing applications, video playback application, or other suitable applications.

When tracking module 650 is included in console 610, tracking module 650 calibrates system 600 using one or more calibration parameters and may adjust one or more calibration parameters to reduce error in determination of the position of display device 605. For example, tracking module 650 adjusts the focus of imaging device 635 to obtain a more accurate position for observed locators on display device 605. Moreover, calibration performed by tracking module 650 also accounts for information received from IMU 630. Additionally, if tracking of display device 605 is lost (e.g., imaging device 635 loses line of sight of at least a threshold number of locators 620), tracking module 650 re-calibrates some or all of system 600.

In some embodiments, tracking module 650 tracks movements of display device 605 using second calibration data from imaging device 635. For example, tracking module 650 determines positions of a reference point of display device 605 using observed locators from the second calibration data and a model of display device 605. In some embodiments, tracking module 650 also determines positions of a reference point of display device 605 using position information from the first calibration data. Additionally, in some embodiments, tracking module 650 may use portions of the first calibration data, the second calibration data, or some combination thereof, to predict a future location of display device 605. Tracking module 650 provides the estimated or predicted future position of display device 605 to application engine 655.

Application engine 655 executes applications within system 600 and receives position information, acceleration information, velocity information, predicted future positions, or some combination thereof of display device 605 from tracking module 650. Based on the received information, application engine 655 determines content to provide to display device 605 for presentation to the user. For example, if the received information indicates that the user has looked to the left, application engine 655 generates content for display device 605 that mirrors the user's movement in an augmented environment. Additionally, application engine 655 performs an action within an application executing on console 610 in response to an action request received from input interface 640 and provides feedback to the user that the action was performed. The provided feedback may be visual or audible feedback via display device 605 or haptic feedback via input interface 640.

FIG. 7 is an isometric view of display device 700 in accordance with some embodiments. In some other embodiments, display device 700 is part of some other electronic display (e.g., a digital microscope, a head-mounted display device, etc.). In some embodiments, display device 700 includes light emission device 710 (e.g., a light emission device array) and an optical assembly 730, which may include one or more lenses and/or other optical components. In some embodiments, display device 700 also includes an IR detector array.

Light emission device 710 emits image light and optional IR light toward the viewing user. Light emission device 710 includes one or more light emission components that emit light in the visible light (and optionally includes components that emit light in the IR). Light emission device 710 may include, e.g., an array of LEDs, an array of microLEDs, an array of organic LEDs (OLEDs), an array of superluminescent LEDs (sLEDS) or some combination thereof.

In some embodiments, light emission device 710 includes an emission intensity array (e.g., a spatial light modulator) configured to selectively attenuate light emitted from light emission device 710. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is transmitted. In some embodiments, display device 700 uses the emission intensity array to facilitate providing image light to a location of pupil 750 of eye 740 of a user, and minimize the amount of image light provided to other areas in the eyebox. In some embodiments, display device 700 includes, or is optically coupled with, electro-optic devices operating as a display resolution enhancement component. In some embodiments, display device 700 is an augmented reality display device. In such embodiments, display device 700 includes, or is optically coupled with, electro-optic devices operating as a waveguide-based combiner or as a polarization selective reflector.

In some embodiments, the display device 700 includes one or more lenses. The one or more lenses receive modified image light (e.g., attenuated light) from light emission device 710, and direct the modified image light to a location of pupil 750. The optical assembly may include additional optical components, such as color filters, minors, etc.

In some embodiments, the optical assembly 730 includes an electro-optic device (e.g., 100) described above with respect to FIGS. 1-2, 3A-3C, and 4. The electro-optic device 100 has a variable transmittance (e.g., has a first transmittance curve at a first time and a second transmittance curve distinct from the first transmittance curve at a second time mutually exclusive from the first time). The electro-optic device 100 conditionally reduces intensity of light passing through the electro-optic device 100. In some embodiments, the electro-optic device 100 has only a single window that has a uniform transmittance across the window at each time (e.g., the electro-optic device 100 operates as a single variable intensity filter). In some embodiments, the electro-optic device 100 has a plurality of regions, as shown in FIG. 7, where each region may has a transmittance independent of transmittances of other regions. For example, the electro-optic device 100 may include an array of the structure shown in FIGS. 1 and 2.

An optional IR detector array detects IR light that has been retro-reflected from the retina of eye 740, a cornea of eye 740, a crystalline lens of eye 740, or some combination thereof. The IR detector array includes either a single IR sensor or a plurality of IR sensitive detectors (e.g., photodiodes). In some embodiments, the IR detector array is separate from light emission device 710. In some embodiments, the IR detector array is integrated into light emission device 710.

In some embodiments, light emission device 710 including an emission intensity array make up a display element. Alternatively, the display element includes light emission device 710 (e.g., when light emission device 710 includes individually adjustable pixels) without the emission intensity array. In some embodiments, the display element additionally includes the IR array. In some embodiments, in response to a determined location of pupil 750, the display element adjusts the emitted image light such that the light output by the display element is refracted by one or more lenses toward the determined location of pupil 750, and not toward other locations in the eyebox.

In some embodiments, display device 700 includes one or more broadband sources (e.g., one or more white LEDs) coupled with a plurality of color filters, in addition to, or instead of, light emission device 710.

In light of these principles, we now turn to certain embodiments.

In accordance with some embodiments, an optical device (e.g., electro-optic device 100) includes a first electrode (e.g., electrode 110) and a medium (e.g., medium 210) that includes ferroelectric liquid crystals (e.g., liquid crystals 212) and chiral dopants (e.g., chiral dopants 214). The medium is located adjacent to the first electrode.

In some embodiments, the first electrode is transparent. For example, the first electrode may be made with an optically-transparent conductive material, such as indium-tin-oxide (ITO). In some embodiments, the first electrode is opaque.

In some embodiments, the optical device includes a second electrode (e.g., second electrode 130) that is distinct and separate from the first electrode.

In some embodiments, the second electrode is transparent. For example, the first electrode may be made with an optically-transparent conductive material, such as indium-tin-oxide (ITO). In some embodiments, the second electrode is opaque.

In some embodiments, the first electrode and the second electrode extend along a common plane. For example, as shown in FIG. 2, the electrodes 110 and 130 are on a common plane.

In some embodiments, the first electrode extends along a first plane, and the second electrode extends along a second plane parallel to, and offset from, the first plane. For example, the first electrode and the second electrode may be parallel to each other but may be located at different heights on a substrate.

In-plane electric field switching (IPS) facilitates implementation of the electro-optic device as an array. For example, an optical system may include an array of pixels, where each pixel includes an electro-optic device described herein. Such configuration allows the optical system to individually control each pixel so that the respective pixels transmits or blocks light independently.

In some embodiments, the first electrode is separated from the second electrode by at least 20 μm (e.g., the distance 250 is at least 20 μm). In some embodiments, the distance 250 is 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 150, 200, 250, 300, 350, 400, 450, 500, 600, 700, 800, 900, 1000 μm or within an interval between any two of the aforementioned numbers.

In some embodiments, the optical device includes a first substrate (e.g., substrate 14) located adjacent to the first electrode.

In some embodiments, the optical device includes a second substrate (e.g., substrate 150) distinct and separate from the first substrate.

In some embodiments, the first substrate is separated from the second substrate by at least 1 μm (e.g., the distance 260 is at least 1 μm). In some embodiments, the distance 260 is 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 150, 200, 250, 300, 350, 400, 450, 500, 600, 700, 800, 900, 1000 μm or within an interval between any two of the aforementioned numbers.

In some embodiments, the optical device includes a first optical polarizer (e.g., the optical polarizer 260).

In some embodiments, the optical device includes a second optical polarizer (e.g., the optical polarizer 270) distinct from the first optical polarizer. The first optical polarizer is located adjacent to the first substrate and the second optical polarizer is located adjacent to the second substrate, or the first optical polarizer is located adjacent to the second substrate and the second optical polarizer is located adjacent to the first substrate.

In some embodiments, the ferroelectric liquid crystals include one or more selected from a group consisting of: aromatic mesogens with 2,5-substituted 1,3-dioxane groups, aromatic mesogens with two or more oriented ester bonds and nitro end group, and aromatic ester mesogens with nitrile end group.

In some embodiments, the ferroelectric liquid crystals include one or more selected from a group consisting of: a rod-shaped material with 1,3-dioxane group, 4-[(4-nitrophenoxy)carbonyl]phenyl2,4-dimethoxybenzoate, and

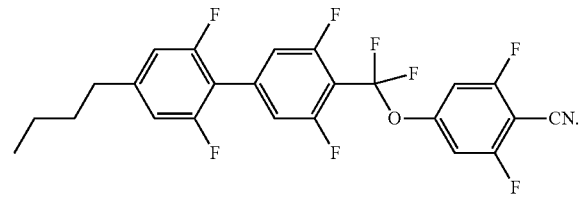 [SMILES: CCCCc1cc(F)c(-c2cc(F)c(C(F)(F)Oc3cc(F)c(C#N)c(F)c3)c(F)c2)c(F)c1]

In some embodiments, the chiral dopants include one or more selected from a group consisting of ZLI811, BDH1281, R5011, and S5011.

In some embodiments, the chiral dopants include one or more selected from a group consisting of R2011, S2011, R1011, S1011, CB15, S811, and CBI15.

In accordance with some embodiments, a head-mounted display device (e.g., display device 500 or 700) includes a display panel (e.g., display panel 510 or light emission device 710) and any optical device described herein (e.g., the optical device 100). The optical device is positioned adjacent to the display panel so that light passing through the optical device impinges on the display panel (e.g., FIG. 7).

In some embodiments, the optical device modifies an intensity of the light passing through the optical device.

In accordance with some embodiments, a method includes providing, at a first time, a first voltage gradient between a first electrode and a second electrode distinct and separate from the first electrode (e.g., a voltage gradient corresponding to a first voltage applied across electrodes 110 and 130, such as V3 in FIG. 3C). A medium that includes ferroelectric liquid crystals and chiral dopants is located adjacent at least to the first electrode. The method also includes providing, at a second time mutually exclusive to the first time, a second voltage gradient less than the first voltage gradient between the first electrode and the second electrode (e.g., a voltage gradient corresponding to a second voltage applied across electrodes 110 and 130, such as V1 in FIG. 3A).

In some configurations, the optical device has a high optical transmittance (e.g., 410) when no (or low) electric field is applied and a low optical transmittance (e.g., 420) when sufficient (or high) electric field is applied. For example, the optical device may include a source of electrostatic (e.g., an electrostatic material) to arrange liquid crystals in a state with low optical transmittance. Alternatively, the optical device may include an electrical power storage (e.g., a battery or a capacitor) to generate an electrical field to place the optical device in a state with a low optical transmittance.

In some other configurations, the optical device may have a low optical transmittance when no (or low) electric field is applied and a high optical transmittance when sufficient (or high) electric field is applied. For example, the optical device may include a source of electrostatic (e.g., an electrostatic material) to arrange liquid crystals in a state with high optical transmittance. Alternatively, the optical device may include an electrical power storage (e.g., a battery or a capacitor) to generate an electrical field to place the optical device in a state with a high optical transmittance.

In some embodiments, the pitch of the liquid crystals (e.g., 214) is selected (e.g., by selecting the chiral dopant) to correspond to a non-visible wavelength (e.g., ultraviolet or infrared). In some embodiments, the chiral dopants are selected to provide a particular pitch for the liquid crystals (e.g., when no electric field is provided).

In some embodiments, the first voltage gradient is less than 0.2 V/μM. In some embodiments, the first voltage gradient is less than 0.19, 0.18, 0.17, 0.16, 0.15, 0.14, 0.13, 0.12, 0.11, 0.10, 0.09, 0.08, 0.07, 0.06, 0.05, 0.04, or 0.03 V/μM or within an interval between any two of the aforementioned numbers. In some embodiments, the first voltage gradient greater than 0.2 V/RM may be used.

In some embodiments, the first voltage gradient is greater than 0.018 V/μM, and the second voltage gradient is less than 0.018 V/μM. In some embodiments, the first voltage gradient is greater than 0.01 V/μM, and the second voltage gradient is less than 0.01 V/μM. In some embodiments, the first voltage gradient is greater than 0.1 V/μM, and the second voltage gradient is less than 0.1 V/μM.

In some embodiments, the electro-optic device is operated at a high temperature (e.g., 100° C., 122° C., etc.) or at room temperature (e.g., 20° C.).

Although head-mounted displays are illustrated as apparatus that include the described electro-optic devices, such electro-optic devices may be used in other systems, devices, and apparatus. For example, the electro-optic devices described herein may be used as smart windows (for buildings or vehicles) or switchable shutters.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:
1. An optical device, comprising:
a first electrode;
a second electrode that is distinct and separate from the first electrode; and
a medium that includes ferroelectric liquid crystals and chiral dopants, wherein:
the medium is located adjacent to the first electrode;
the ferroelectric liquid crystals include one or more selected from a group consisting of: aromatic mesogens with 2,5-substituted 1,3-dioxane groups, aromatic mesogens with two or more oriented ester bonds and nitro end group, and aromatic ester mesogens with nitrile end group or one or more selected from a group consisting of: a rod-shaped material with 1,3-dioxane group, 4-[(4-nitrophenoxy)carbonyl]phenyl2,4-dimethoxybenzoate, and

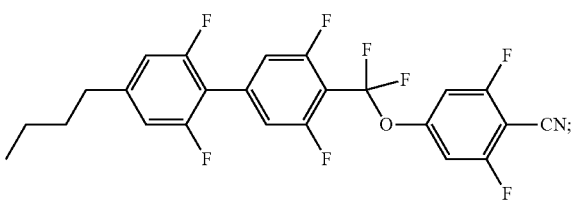 [SMILES: CCCCc1cc(F)c(-c2cc(F)c(C(F)(F)Oc3cc(F)c(C#N)c(F)c3)c(F)c2)c(F)c1]

the chiral dopants include one or more selected from a group consisting of ZLI811, BDH1281, R5011, and S5011 or one or more selected from a group consisting of R2011, S2011, R1011, S1011, CB15, S811, and CBI15; and a first voltage gradient of less than 0.2 V/μm is applied between the first electrode and the second electrode distinct and separate from the first electrode.

2. The optical device of claim 1, wherein:
the first electrode is transparent.

3. A head-mounted display device, comprising:
a display panel; and
the optical device of claim 1 positioned adjacent to the display panel so that light passing through the optical device impinges on the display panel.

4. The optical device of claim 1, wherein:
the second electrode is transparent.

5. The optical device of claim 4, wherein:
the first electrode extends along a first plane; and
the second electrode extends along a second plane parallel to, and offset from, the first plane.

6. The optical device of 4, wherein:
the first electrode and the second electrode extend along a common plane.

7. The optical device of 4, wherein:
the first electrode is separated from the second electrode by at least 20 μm.

8. The optical device of claim 1, further comprising:
a first substrate located adjacent to the first electrode.

9. The optical device of claim 8, further comprising:
a second substrate distinct and separate from the first substrate.

10. The optical device of claim 9, wherein:
the first substrate is separated from the second substrate by at least 1 μm.

11. The optical device of claim 9, further comprising:
a first optical polarizer.

12. The optical device of claim 11, further comprising:
a second optical polarizer distinct from the first optical polarizer, wherein:
the first optical polarizer is located adjacent to the first substrate and the second optical polarizer is located adjacent to the second substrate; or
the first optical polarizer is located adjacent to the second substrate and the second optical polarizer is located adjacent to the first substrate.

13. A method, comprising:
providing, at a first time, a first voltage gradient between a first electrode and a second electrode distinct and separate from the first electrode, wherein a medium that includes ferroelectric liquid crystals and chiral dopants is located adjacent at least to the first electrode and the first voltage gradient is less than 0.2 V/μm; and
providing, at a second time mutually exclusive to the first time, a second voltage gradient less than the first voltage gradient between the first electrode and the second electrode.

14. The method of claim 13, wherein:
the first voltage gradient is greater than 0.018 V/μm; and
the second voltage is less than 0.018 V/μm.

15. The method of claim 13, wherein:
the ferroelectric liquid crystals include one or more selected from a group consisting of: aromatic mesogens with 2,5-substituted 1,3-dioxane groups, aromatic mesogens with two or more oriented ester bonds and nitro end group, and aromatic ester mesogens with nitrile end group or one or more selected from a group consisting of: a rod-shaped material with 1,3-dioxane group, 4-[(4-nitrophenoxy)carbonyl]phenyl2,4-dimethoxybenzoate, and

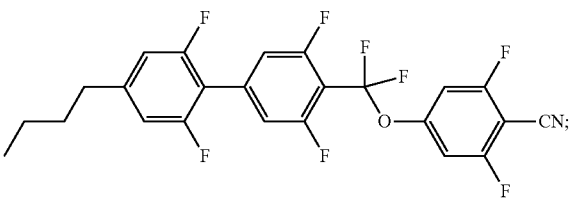 [SMILES: CCCCc1cc(F)c(-c2cc(F)c(C(F)(F)Oc3cc(F)c(C#N)c(F)c3)c(F)c2)c(F)c1]

and
the chiral dopants include one or more selected from a group consisting of ZLI811, BDH1281, R5011, and S5011 or one or more selected from a group consisting of R2011, S2011, R1011, S1011, CB15, S811, and CBI15.

* * * * *